(12) United States Patent
Lai et al.

(10) Patent No.: US 11,455,379 B2
(45) Date of Patent: Sep. 27, 2022

(54) CONTROL SYSTEM AND METHOD THEREOF FOR SECURE MANUFACTURING

(71) Applicants: Yu-Cheng Lai, Tortola (BV); Chia-Yen Lu, Tortola (BV)

(72) Inventors: Yu-Cheng Lai, Tortola (BV); Chia-Yen Lu, Tortola (BV)

(73) Assignee: ECOLUX TECHNOLOGY CO., LTD., Hsinchu County (TW)

( * ) Notice: Subject to any disclaimer, the term of this patent is extended or adjusted under 35 U.S.C. 154(b) by 380 days.

(21) Appl. No.: 16/446,264

(22) Filed: Jun. 19, 2019

(65) Prior Publication Data

US 2020/0401676 A1 Dec. 24, 2020

(51) Int. Cl.
| | |
|---|---|
| H04L 9/40 | (2022.01) |
| G06F 21/12 | (2013.01) |
| H04L 9/32 | (2006.01) |
| G06F 21/60 | (2013.01) |

(52) U.S. Cl.
CPC ............ G06F 21/12 (2013.01); G06F 21/606 (2013.01); H04L 9/3247 (2013.01)

(58) Field of Classification Search
CPC ....... G06F 21/12; G06F 21/606; H04L 9/3247
See application file for complete search history.

(56) References Cited

U.S. PATENT DOCUMENTS

| | | | | |
|---|---|---|---|---|
| 8,214,653 B1* | 7/2012 | Marr | ......................... | G06F 8/65 713/189 |
| 8,817,986 B2* | 8/2014 | Chatt | ..................... | H04L 9/3247 380/255 |
| 8,930,694 B2* | 1/2015 | Fernandez de Torres | ................... | G06Q 20/322 713/168 |
| 9,584,498 B1* | 2/2017 | Forehand | ............... | G06F 21/445 |
| 10,057,243 B1* | 8/2018 | Kumar | ................... | H04L 9/3263 |
| 10,700,875 B1* | 6/2020 | Daruwalla | ............... | H04L 9/30 |
| 2002/0191797 A1* | 12/2002 | Perlman | .................. | H04L 9/088 713/153 |
| 2006/0029400 A1* | 2/2006 | Nasu | ...................... | H04L 9/3263 399/12 |
| 2009/0290716 A1* | 11/2009 | O'Connor | ............... | G06F 21/10 380/278 |
| 2011/0154046 A1* | 6/2011 | Fradet | .................. | G06K 7/1413 713/179 |
| 2012/0198548 A1* | 8/2012 | Chen | ...................... | H04L 9/3247 726/19 |
| 2014/0068246 A1* | 3/2014 | Hartley | ..................... | G09C 1/00 713/155 |
| 2015/0188706 A1* | 7/2015 | Weiss | ..................... | G06K 19/08 380/246 |

(Continued)

*Primary Examiner* — Ghodrat Jamshidi
(74) *Attorney, Agent, or Firm* — Che-Yang Chen; Law Office of Michael Chen (57) ABSTRACT

A control system and method thereof for secure manufacturing, comprising a source end, a verification end, and a production end. Providing a source file, the source end encrypting and signing the source file to generate a transfer file and to generate an authorization information simultaneously, the transfer file being transferred to the production end, and the authorization information being transferred to the verification end. After the production end is authorized by the verification end, the transfer file is verified and decrypted, and can be re-encrypted or not re-encrypted to be written into a product or to generate a product.

11 Claims, 6 Drawing Sheets

(56) References Cited

U.S. PATENT DOCUMENTS

2015/0347932 A1* 12/2015 Harris .................... G06Q 10/06
                                                      705/51
2018/0198627 A1*  7/2018 Mullins ................. H04L 9/0877
2020/0274707 A1*  8/2020 Kiiskila ................. H04L 9/088

* cited by examiner

CONTROL SYSTEM AND METHOD THEREOF FOR SECURE MANUFACTURING

BACKGROUND OF THE INVENTION

Field of Invention

The present invention relates to a control system and method thereof for secure manufacturing.

Related Art

Whether it is the research and development of smart devices, wearable devices, or devices of Internet of Things (IoT), it is always focusing on the development of software and firmwares for central processing units or microcontroller units. In the mass production process, these software and firmwares must be burned or processed at the factory, but these software and firmwares may leak out due to various factors including human factor, causing serious losses to product developers or manufacturers.

After the product is officially launched onto the market, if the product performs quite well, the competitors will want to learn or imitate, and they might try to steal the software and firmwares and important data in the chip by illegal cloning or reverse engineering. Once the software and firmwares in the chip got stolen or cracked, the product will quickly lose its competitive advantages, and even cause the customers' personal data being stolen or the system being invaded. With the advent of the IoT era, hackers can invade various Internet-connected products through the Internet, and therefore it is imperative to protect the software and firmwares in the chip from illegal copying or cracking by means of technology.

SUMMARY OF THE INVENTION

It is an object of the present invention to provide a control system and method thereof for secure manufacturing. A first encryption protection process is performed before a firmware is transferred to prevent the firmware from being stolen during the transfer process. In addition, a second encryption protection process can be performed when the firmware is burned to a chip, and the chip must be decrypted before it can be activated. The above description is based on the firmware as an example, but it is not limited to the firmware, the present invention can be applied to any electronic file to prevent the intellectual property from being illegally copied or illegally cracked.

The control system for secure manufacturing of the present invention is used for controlling products during manufacturing and transferring processes, an embodiment of which comprises: a source end, a verification end, and a production end. The source end comprises a first security module, an encryption module, and a secure transfer processing module. The first security module provides an encryption key to the encryption module, and a source file is added with the encryption key via the encryption module to generate an encrypted file. The first security module provides an encryption public key and a signature private key to the secure transfer processing module. The encrypted file is added with the encryption public key and the signature private key via the secure transfer processing module to generate a transfer file, and the source end generates an authorization information. The verification end comprises a security verification module, and the security verification module receives the authorization information. The production end comprises a second security module, a security processing module, and a manufacturing module, and the security processing module receives the transfer file. The second security module comprises a verification public key, a decryption private key, and a decryption key. The verification public key corresponds to the signature private key, the decryption private key corresponds to the encryption public key, and the decryption key corresponds to the encryption key. The transfer file is verified by the verification public key via the second security module. If the transfer file passes the verification, the second security module decrypts the transfer file with the decryption private key to become the encrypted file, and the decryption key decrypts the encrypted file.

An embodiment of the control method for secure manufacturing of the present invention comprising: providing a source file; encrypting the source file at a source end to generate a transfer file and to generate an authorization information; transferring the authorization information to a verification end, and transferring the transfer file to a production end; the verification end verifying the production end according to the authorization information; and if the production end passing the verification, the production end decrypting the transfer file.

In order to make the above objects and other objects, features and advantages of the present invention more obvious and understandable, the embodiments are described in detail below with reference to the accompanying drawings.

DETAILED DESCRIPTION OF THE INVENTION

Figure 1:
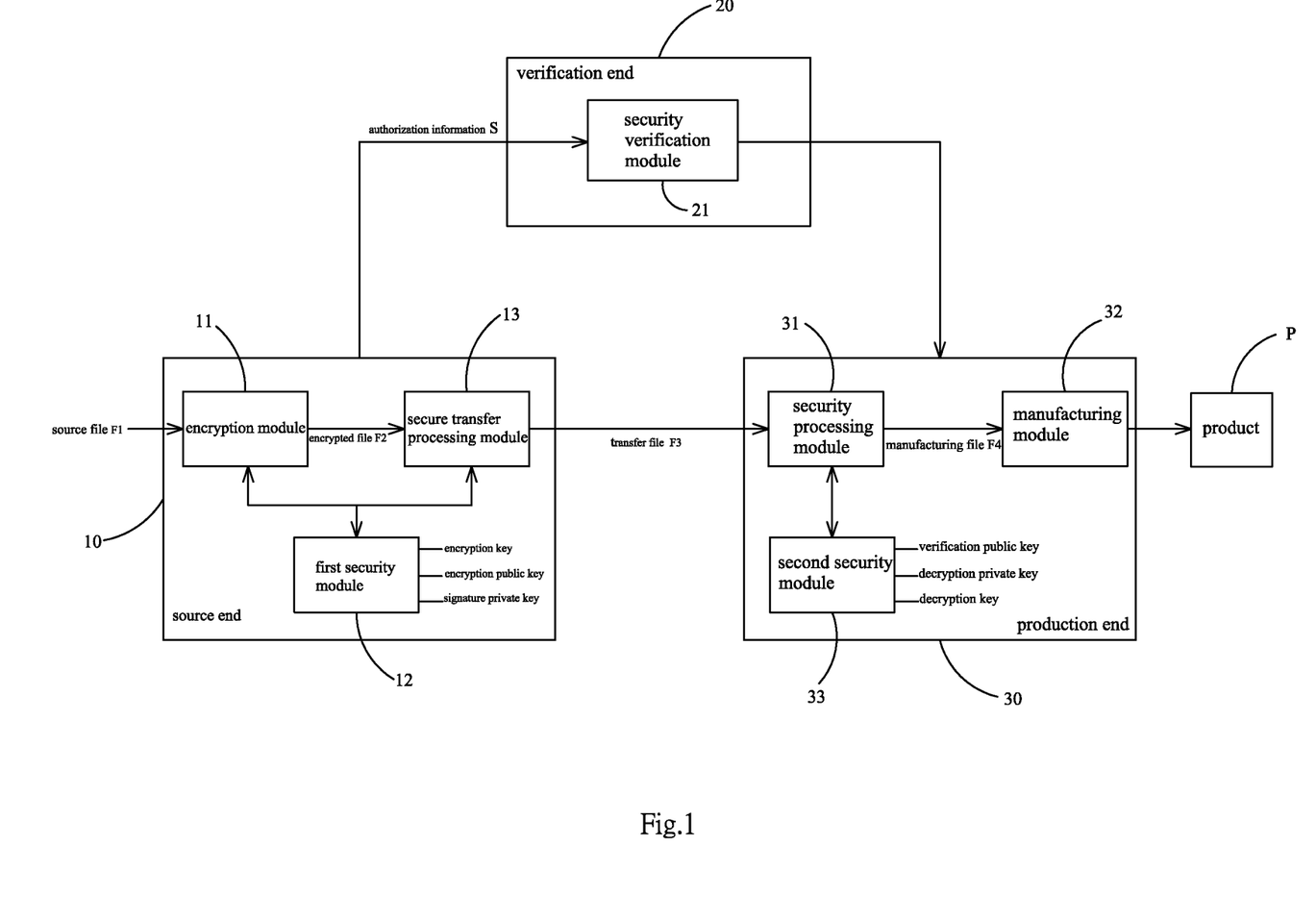
FIG. 1 is a system block diagram of an embodiment of a control system for secure manufacturing of the present invention.
Figure 3:
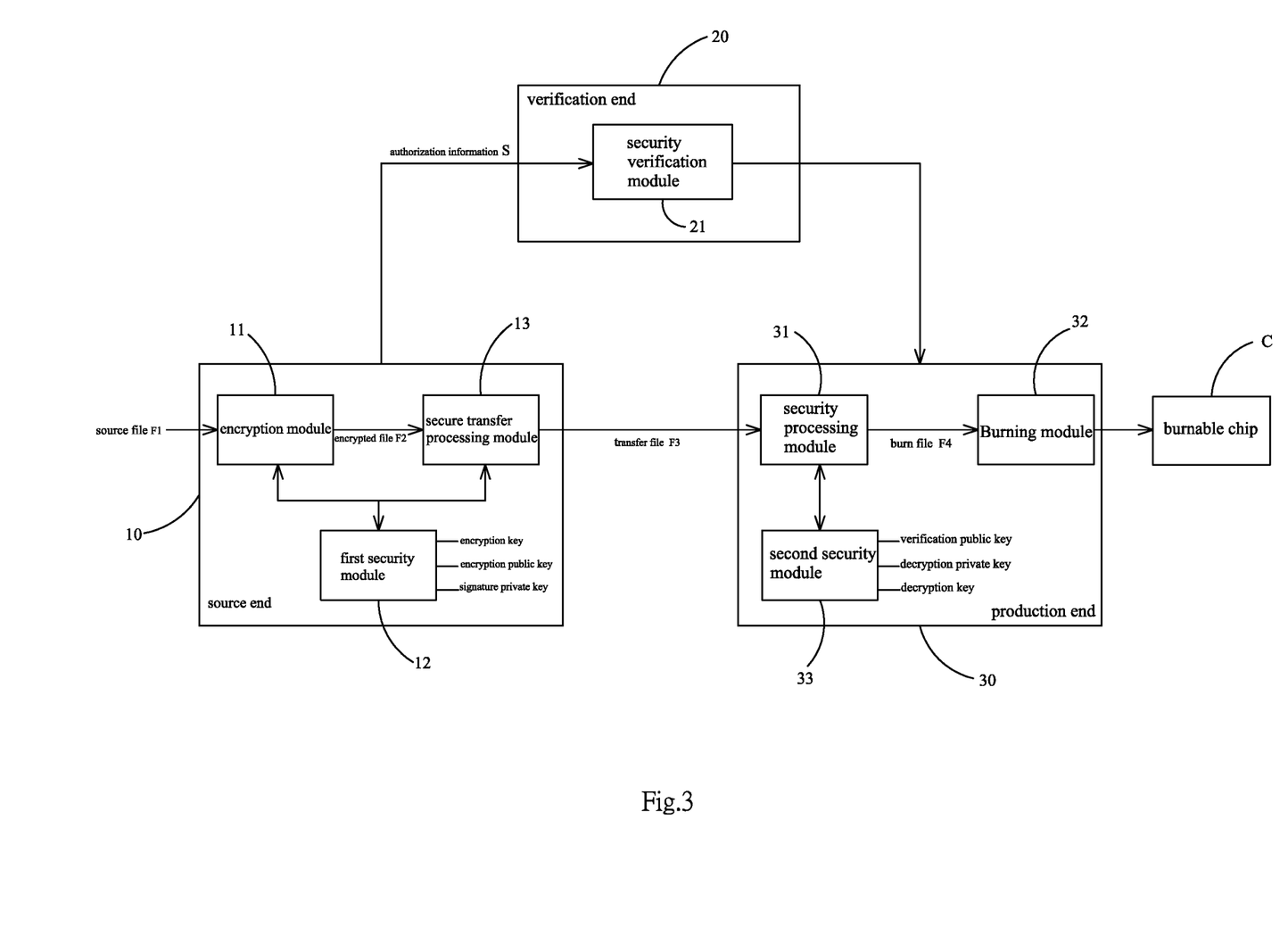
FIG. 3 is a system block diagram of another embodiment of the control system for secure manufacturing of the present invention.

Referring to FIGS. 1 and 3, which are respectively an embodiment and another embodiment of a control system for secure manufacturing of the present invention for use in controlling a firmware and a burnable chip C during manufacturing and transferring processes. The control system for secure manufacturing of the present invention comprises a source end 10, a verification end 20, and a production end 30.

A source file (source firmware) F1 is provided. The source end 10 comprises an encryption module 11, a first security module 12, and a secure transfer processing module 13. Wherein the first security module 12 comprises an encryption key, an encryption public key, and a signature private key. In order to prevent the source file F1 from being stolen or copied and cracked during a transfer process (electronic or physical delivery), the source end 10 uses the encryption module 11 and performs an encryption process on the source file F1 to generate an encrypted file F2. In this embodiment, the encryption module 11 uses the first security module 12 to encrypt the source file F1 with the encryption key to generate the encrypted file F2. The encrypted file F2 is then transferred to the secure transfer processing module 13, and the secure transfer processing module 13 uses the first security module 12 to encrypt and sign the encrypted file F2 and the encryption key (symmetric) with the encryption public key and the signature private key, and generates a transfer file F3. The secure transfer processing module 13 transfers the transfer file F3 to the production end 30 and transfers an authorization information S to the verification end 20 simultaneously.

The verification end 20 comprises a security verification module 21, and the security verification module 21 receives the authorization information S. In this embodiment, the authorization information S is related to whether the production end 30 is the designated production end of the source end 10, and a quantity of the burnable chip C authorized for the production end 30.

The production end 30 comprises a security processing module 31, a manufacturing module 32, and a second security module 33. The manufacturing module 32 is connected to the security processing module 31, and the second security module 33 is connected to the security processing module 31. The security processing module 31 receives the transfer file F3 of the source end 10. After the security processing module 31 obtains the authorization information S from the security verification module 21 of the verification end 20, a manufacturing quantity of a product is authorized.

The second security module 33 comprises a verification public key, a decryption private key, and a decryption key. When the transfer file F3 is transferred to the security processing module 31, after obtaining the authorization the security processing module 31 verifies with the verification public key of the second security module 33 and the signature private key of the transfer file F3, verifying whether the transfer file F3 is from the correct source end 10. After the transfer file F3 is verified as being from the correct source end 10, the security processing module 31 decrypts the verified transfer file F3 with the decryption private key by using the second security module 33, and the encrypted file F2 and the encryption key are generated in the second security module 33. The encryption key is symmetrical, that is, the decryption key. The security processing module 31 decrypts the encrypted file F2 with the decryption key in the second security module 33, and generates the source file F1, and finally a manufacturing file F4 is generated according to the requirements of the manufacturing module 32. The manufacturing module 32 adds the manufacturing file F4 to a target product or generates a target product P according to the manufacturing file F4.

In this embodiment, the signature private key and the verification public key are generated from an asymmetric key pair of the first security module 12, and the encryption public key and the decryption private key are generated from an asymmetric key pair of the second security module 33. Therefore, after the verification public key is generated in the first security module 12, the verification public key needs to be transferred to the second security module 33 of the production end 30 for verification of the transfer file F3 at the production end 30. Similarly, after the encryption public key is generated in the second public security module 33, the encryption public key needs to be transferred to the first security module 12 of the source end 10 for encrypting the source file F1.

As shown in FIG. 3, in the actual application, the manufacturing module 32 can be a burning module, the source file F1 can be a source firmware, the encrypted file F2 can be an encrypted firmware, and the manufacturing file F4 can be a burn file. The burn file comprises firmwares for burning to the chip C, and the chip C can be all chips containing firmwares or software, such as microcontroller (MCU), microprocessor (MPU), graphics processor (GPU), central processing unit (CPU), flash memory (Flash), embedded module, embedded system, wearable device or device of Internet of Things, etc., but the present invention is not limited thereto. The source file F1 and the manufacturing file F4 can also be design data of three-dimensional printing, the manufacturing module 32 can be a three-dimensional printing device, and the target product P can be a three-dimensional print product.

After the security processing module 31 completes a pre-manufacturing process, the security processing module 31 transfers the manufacturing file F4 to the manufacturing module 32, and the manufacturing module 32 adds the manufacturing file F4 one by one to the target product or generates the target product according to an authorized quantity until the authorized quantity is reached. The security processing module 31 counts each time when the manufacturing module 32 adds the manufacturing file F4 to the target product or generates the target product, calculates a quantity of the produced products, and transfers the statistical production quantity to the verification end 20, and the verification end 20 verifies whether the produced quantity is the same as the authorized production quantity.

In this embodiment, the source end 10 can be a software and firmwares developer, the production end 30 can be a burning factory, the security processing module 31 and the second security module 33 can be a control center of a burning factory, the manufacturing module 32 can be a chip burning machine, and the verification end 20 can be a software developer or a third party's impartial supervisory unit.

Figure 2:
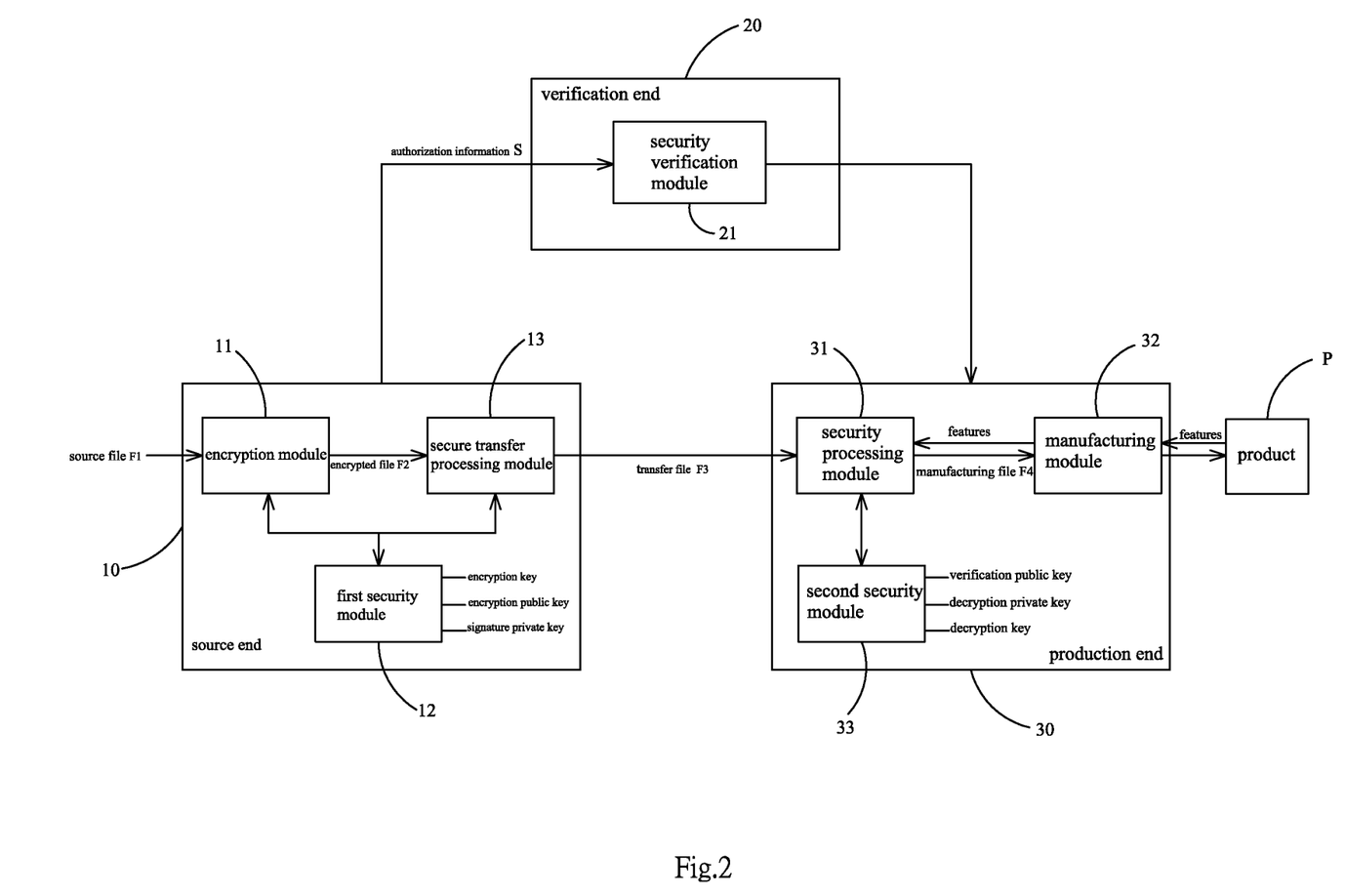
FIG. 2 is a system block diagram of an application example of the control system for secure manufacturing of the present invention.
Figure 4:
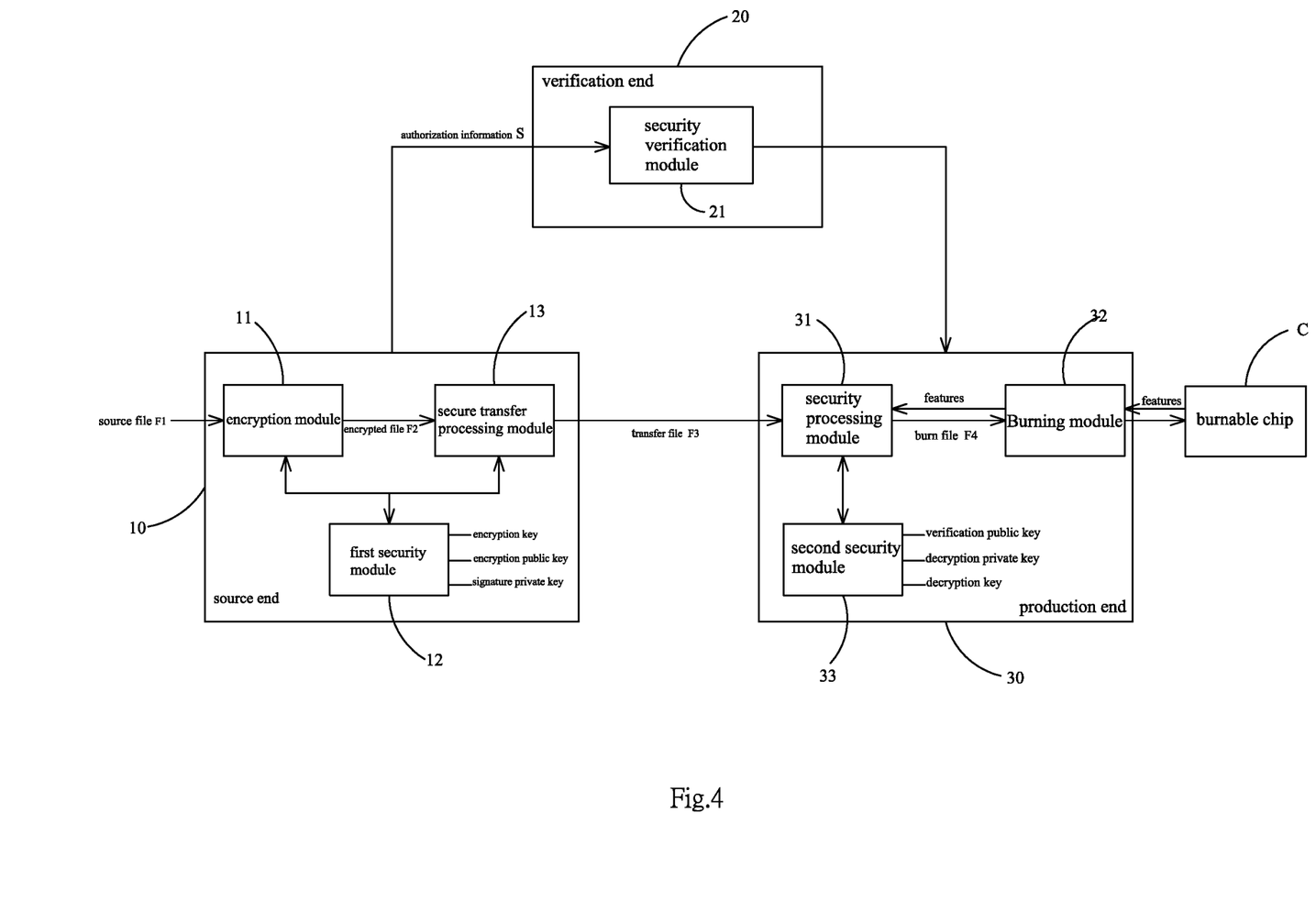
FIG. 4 is a system block diagram of another application example of the control system for secure manufacturing of the present invention.

In another embodiment of the control system for secure manufacturing of the present invention, in addition to the embodiment of FIG. 1, as shown in FIGS. 2 and 4, in addition to a first encryption performed by the encryption module 11 on the source firmware F1 to prevent theft during the transferring process, in order to prevent the design of the product from being stolen during the burning process or the product from being reverse engineered after being shipped from the factory to obtain the design information, a second encryption can be performed on the manufacturing file F4 before burning. A method of the second encryption is as follows: the manufacturing module 32 obtaining product features, such as a chip-specific identification code, and then the manufacturing module 32 transferring the product features to the security processing module 31, after the security processing module 31 decrypting the transfer file F3 by using the second security module 33 to generate the source firmware F1, the security processing module 31 using the second security module 33 again to generate a symmetric key with the product features as the key material for performing the second encryption on the source firmware F1, and finally generating a burn file F4' according to the requirements of the manufacturing module 32, and the manufacturing module 32 writing the burn file F4' into the chip C.

For the chip C written with the second encrypted firmware, the second encryption and decryption method is designed according to the hardware characteristics of the chip C, and the product features are unique to the chip C, so the second encrypted firmware can only be correctly decrypted and operated in the chip C. In this way, even if the competitors or the hackers obtain the chip C, the source firmware cannot be illegally acquired, and the design of the product (software and firmwares) can be effectively prevented from being stolen or reverse engineered during the manufacturing process or after the sale, thereby reducing the risk of intrusion of the chip C and its associated systems.

In addition, after the manufacturing module 32 achieves a manufacturing stage, the security processing module 31 transfers a subsequent manufacturing request to the verification end 20 for verification. After the subsequent burning request of the security processing module 31 is authorized, the manufacturing module 32 performs the subsequent burning. The manufacturing stage can be the manufacturing module 32 performs writing of the product P each time. The burning stage can be the manufacturing module 32 completes writing of a predetermined quantity of products within a predetermined time, for example, a quantity of the product P being written is 600 pieces. After the manufacturing module 32 burns a batch of 60 pieces in one hour each time, the security processing module 31 can issue the subsequent burning request, and wait until the subsequent burning request is verified, and then proceed to the next batch of burning operation of the chips C. If the manufacturing module 32 and the verification end 20 cannot be connected during the burning process, the manufacturing module 32 can still continue to complete the burning of the verified batch of the chips C. During the period in which the manufacturing module 32 burns the chips C, the connection between the security processing module 31 and the verification end 20 is restored. In addition, when the security processing module 31 and the verification end 20 cannot be connected, it can be preset to allow the manufacturing module 32 to continue to burn a certain quantity of the chips C so as not to affect the production capacity of the burning operation. However, before the first burning operation, the security processing module 31 and the verification end 20 must remain connected before verification can be performed, otherwise the overall burning operation cannot be performed.

Figure 5:
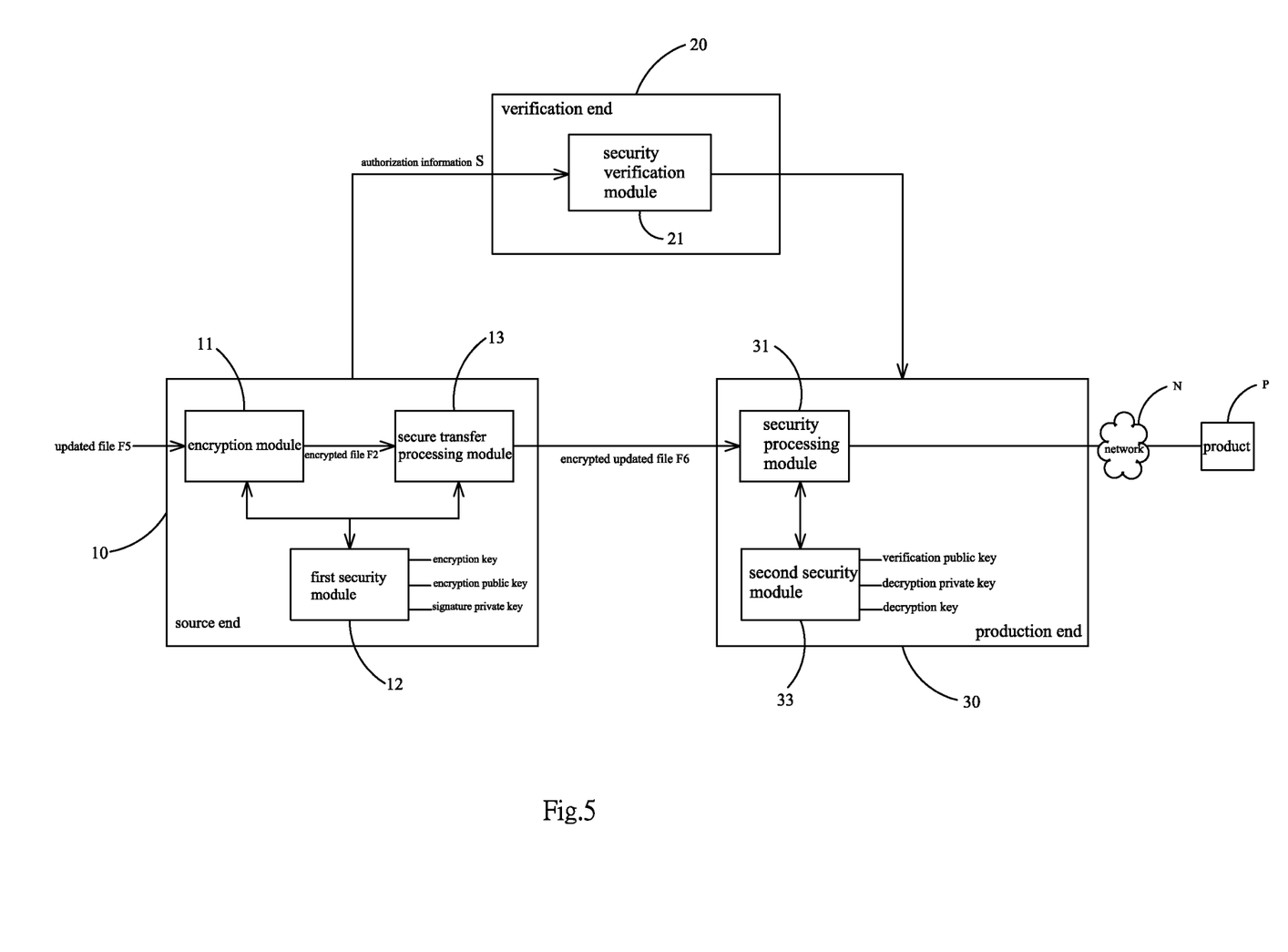
FIG. 5 is a system block diagram of the control system for secure manufacturing of the present invention being used for an updated file.

Referring to FIG. 5, when the source end 10 updates the source file F1, an updated file F5 is generated, and the updated file F5 is encrypted and signed in the manner shown in FIG. 1 by using the encryption module 11, the first security module 12, and the secure transfer processing module 13 to generate an encrypted updated file F6 and generate an update authorization information S'. The encrypted updated file F6 is transferred to the security processing module 31 of the production end 30, and the update authorization information S' is transferred to the verification end 20. The production end 30 can issue a firmware update notification to users of the chip C. If the users want to update the firmware, the users can submit an update request to the security processing module 31 via a network N, the security processing module 31 requests verification by the verification end 20 according to the update request, and the verification end 20 verifies the update request according to the update authorization information S'. After the update request of the security processing module 31 is verified, the encrypted updated file F6 performs decryption by using the second security module 33, and the security processing module 31 transfers the decrypted updated file F5 to the chip C via the network N for updating.

Figure 6:
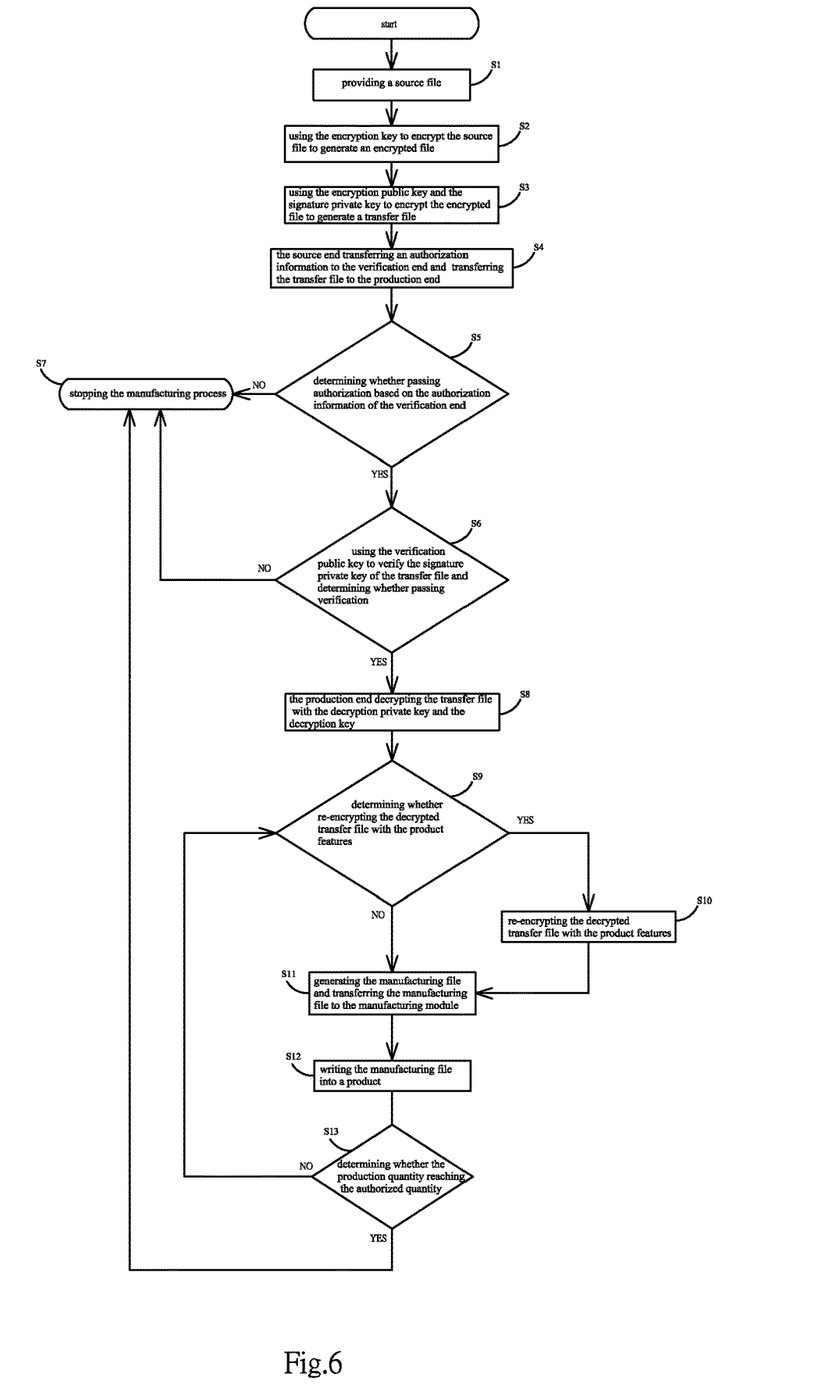
FIG. 6 is a flow chart of an embodiment of a control method for secure manufacturing of the present invention.

Referring to FIG. 6, a control method for secure manufacturing of the present invention comprising the following steps:

in step S1, providing a source file F1, and then proceeding to step S2;

in step S2, using the encryption module 11 to perform an encryption process on the source file F1 by using the first security module 12 with the encryption key to generate an encrypted file F2, and then proceeding to step S3;

in step S3, the secure transfer processing module 13 of the source end 10 using the first security module 12 to encrypt and sign the encrypted file F2 and the encryption key (symmetric) with the encryption public key and the signature private key to generate a transfer file F3 and to generate an authorization information S, and then proceeding to step S4;

in step S4, transferring the authorization information S to the verification end 20, transferring the transfer file F3 to the production end 30, and then proceeding to step S5;

in step S5, the security processing module 31 of the production end 30 obtaining the authorization information S of the verification end 20, if the authorization being passed, proceeding to step S6, if the authorization being not passed, reporting error, and then proceeding to step S7;

in step S6, the security processing module 31 using the second security module 33 to verify the signature private key of the transfer file F3 with the verification public key, and verifying whether the transfer file F3 being from the correct source end 10, when the transfer file F3 being verified from the correct source end 10, proceeding to step S8, when the transfer file F3 being verified not from the correct source end 10, reporting error, and then proceeding to step S7;

in step S7, stopping the manufacturing process, at this time the production end 30 inquiring whether the transfer file F3 transferred by the source end 10 being correct;

in step S8, the security processing module 31 decrypting the verified transfer file F3 with the decryption private key by using the second security module 33, generating the encrypted file F2 and the encryption key in the second security module 33, the encryption key being symmetrical, that being, the decryption key, then the security processing module 31 decrypting the encrypted file F2 with the decryption key in the second security module 33 to generate the source file F1, and then proceeding to step S9;

in step S9, determining whether to perform a second encryption on the decrypted source file F1 with the product features, if determining to perform the second encryption on the decrypted source file F1 with the product features, proceeding to step S10, and if determining not to perform the second encryption on the decrypted source file F1 with the product features, then proceeding to step S11;

in step S10, the manufacturing module 33 reading the product features, transferring the product features to the security processing module 31, the security processing module 31 using the second security module 33 to perform the second encryption on the decrypted source file F1, and then proceeding to step S11;

in step S11, the security processing module 31 generating the manufacturing files F4, F4', transferring the manufacturing files F4, F4' to the manufacturing module 32, and then proceeding to step S12;

in step S12, the manufacturing module 32 writing the manufacturing files F4, F4' into the product, and then proceeding to step S13; and in step S13, the security processing module 31 counting and comparing a quantity of products produced with a quantity authorized by the authorization information S, if the quantity of the product P produced being less than the authorized quantity, returning to the step S9, determining whether to perform the second encryption, if the quantity of the product P produced reaching the authorized quantity, then proceeding to the step S7 to end the manufacturing process.

In this embodiment, before the transfer of the source file (source firmware) F1, the first encryption processing procedure is used to prevent the firmware from being used after being stolen during the transferring process; in addition, with the second encryption processing procedure, even if unlawful persons obtain the chip C installed with the firmware, the source firmware installed in the chip C or its original codes cannot be obtained by cloning or reverse engineering.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A control system for secure manufacturing, the control system for secure manufacturing comprising:

a source unit, comprising a source firmware and software, having a first security module, an encryption module, and a secure transfer processing module, generating an authorization information and a transfer file; the first security module comprising an encryption key, an encryption public key, and a signature private key;

a verification unit, comprising a verification software having security verification module; and a production unit, comprising a second security module, a security processing module, and a manufacturing module; said second security module and security processing module configured to be a control center for the production unit, and the second security module comprising a verification public key, a decryption private key, and a decryption key;

wherein the encryption module having a micro-processor configured to use the first security module and the encryption key to perform a firmware encryption process on a source firmware to generate an encrypted firmware, and the decryption key is used to decrypt the encrypted firmware;

wherein the secure transfer processing module having a micro-processor configured to use the first security module, the encryption public key, and the signature private key to encrypt and sign the encrypted firmware to generate the transfer file;

wherein the security processing module having a micro-processor configured to receive the transfer file from the secure transfer processing module, after the production unit is authorized by the security verification module, the security processing module performs a pre-manufacturing process to generate a manufacturing file, and the manufacturing module adds the manufacturing file to a product or generates a product according to the manufacturing file;

wherein the pre-manufacturing process having a micro-processor configured to use the second security module, the verification public key, the decryption private key, and the decryption key to restore the transfer file, to re-encrypt the transfer file based on a feature, and to convert the transfer file into the manufacturing file, wherein the feature is unique to the product.

2. The control system for secure manufacturing as claimed in claim 1, wherein the signature private key and the verification public key are generated from an asymmetric key pair of the first security module.

3. The control system for secure manufacturing as claimed in claim 1, wherein the encryption public key and the decryption private key are generated from an asymmetric key pair of the second security module.

4. The control system for secure manufacturing as claimed in claim 1, wherein the security verification module receives the authorization information from the source unit to verify an identity of the production unit for authorization.

5. The control system for secure manufacturing as claimed in claim 1, wherein the pre-manufacturing process uses the second security module, the verification public key, the decryption private key, and the decryption public key to restore the transfer file and convert the transfer file into the manufacturing file.

6. The control system for secure manufacturing as claimed in claim 5, wherein the product refers to all chip products containing firmware or software.

7. The control system for secure manufacturing as claimed in claim 1, wherein the security processing module calculates a quantity of the product that the manufacturing module has manufactured, and transfers the quantity to the verification unit.

8. The control system for secure manufacturing as claimed in claim 1, wherein the source unit updates the source file to generate an updated file, and uses the first security module and the encryption module to encrypt the updated file to generate an encrypted updated file, and to generate an update authorization information, the encrypted updated file is transferred to the security processing module, and the update authorization information is transferred to the verification unit, and then processed by the security verification module of the verification unit, and transferred to the security processing module, the product submits an update request to the security processing module, and the security processing module performs verification according to the update request and the update authorization information, after the update request of the security processing module is verified, and after the encrypted updated file is decrypted by using the second security module, the updated file is transferred to the product by the security processing module for updating.

9. A control method for secure manufacturing, comprising steps of:

providing a source file;

encrypting the source file at a source unit to generate a transfer file and to generate an authorization information;

transferring the authorization information to a verification unit, and transferring the transfer file to a production unit;

the verification unit verifying the production unit according to the authorization information;

if production unit passing the verification, the production unit decrypting the transfer file;

the production unit decrypting the transfer file and re-encrypting the transfer file based on a feature to generate a manufacturing file; and the production unit adding the manufacturing file to a product or generating a product according to the manufacturing file;

wherein the feature is unique to the product;

wherein the source unit comprises an encryption key, an encryption public key, and a signature private key, and the source unit encrypts the source file by using the encryption key, the encryption public key, and the signature private key to generate the transfer file; the production unit comprises a verification public key, a decryption private key, and a decryption key, and the production unit decrypts the transfer file by using the verification public key, the decryption private key, and the decryption key; the verification public key corresponds to the signature private key, the decryption private key corresponds to the encryption public key, and the decryption key corresponds to the encryption key.

10. The control method for secure manufacturing as claimed in claim 9, further comprising steps of:

the production unit decrypting the transfer file to generate a manufacturing file; and the production unit adding the manufacturing file to a product or generating a product according to the manufacturing file.

11. The control method for secure manufacturing as claimed in claim 9, further comprising steps of: counting a quantity of products produced, and comparing the quantity of products produced with a quantity authorized by the authorization information, and if the quantity of the products reaching the authorized quantity, stopping the step, the production unit adding the manufacturing file to a product or generating a product according to the manufacturing file.

\* \* \* \* \*